(12) United States Patent
Tsubouchi et al.

(10) Patent No.: US 11,418,126 B2
(45) Date of Patent: Aug. 16, 2022

(54) INRUSH CURRENT SUPPRESSION DEVICE AND MOTOR DRIVE DEVICE

(71) Applicant: Panasonic Intellectual Property Management Co., Ltd., Osaka (JP)

(72) Inventors: Toshiki Tsubouchi, Osaka (JP); Mineaki Isoda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/275,699

(22) PCT Filed: Jul. 10, 2019

(86) PCT No.: PCT/JP2019/027292
§ 371 (c)(1),
(2) Date: Mar. 12, 2021

(87) PCT Pub. No.: WO2020/059262
PCT Pub. Date: Mar. 26, 2020

(65) Prior Publication Data
US 2022/0045620 A1    Feb. 10, 2022

(30) Foreign Application Priority Data
Sep. 19, 2018  (JP) .............................. JP2018-174385

(51) Int. Cl.
*H02P 9/08*    (2006.01)
*H02P 25/22*   (2006.01)
(Continued)

(52) U.S. Cl.
CPC .......... *H02M 7/062* (2013.01); *H02M 7/4818* (2021.05); *H02M 7/529* (2013.01); *H02H 9/002* (2013.01)

(58) Field of Classification Search
CPC ............ H02M 1/36; H02P 27/08; H02P 25/22
See application file for complete search history.

(56) References Cited

FOREIGN PATENT DOCUMENTS

| JP | 2004-112954 | 4/2004 |
|----|-------------|--------|
| JP | 2010-213473 | 9/2010 |

(Continued)

OTHER PUBLICATIONS

International Search Report of PCT application No. PCT/JP2019/027292 dated Sep. 17, 2019.

*Primary Examiner* — Muhammad S Islam
*Assistant Examiner* — Charles S Laughlin
(74) *Attorney, Agent, or Firm* — WHDA, LLP (57) ABSTRACT

An inrush current suppression device is an inrush current suppression device that suppresses an inrush current flowing from a DC power supply through a mechanical switch, and includes: a first capacitor having one end connected to a positive terminal of the DC power supply through the mechanical switch; a semiconductor switching element connected to the other end of the first capacitor and a negative terminal of DC power supply between the other end of the first capacitor and the negative terminal of the DC power supply; a resistance element connected in parallel to the semiconductor switching element; and a control circuit for controlling the semiconductor switching element. The control circuit has a first output port, and controls ON time and OFF time of the semiconductor switching element by outputting a PWM signal from the first output port to the semiconductor switching element after the mechanical switch is closed.

8 Claims, 5 Drawing Sheets

(51) Int. Cl.
*H02H 3/08* (2006.01)
*H02M 1/36* (2007.01)
*H02M 7/06* (2006.01)
*H02M 7/48* (2007.01)
*H02M 7/529* (2006.01)
*H02H 9/00* (2006.01)

(56) References Cited

FOREIGN PATENT DOCUMENTS

| | | |
|---|---|---|
| JP | 2014-187768 | 10/2014 |
| JP | 2016-178730 | 10/2016 |

INRUSH CURRENT SUPPRESSION DEVICE AND MOTOR DRIVE DEVICE

TECHNICAL FIELD

The present invention relates to an inrush current suppression device that suppresses an inrush current flowing from a DC power supply via a mechanical switch and a motor drive device.

BACKGROUND ART

Conventionally, for example, an in-vehicle device that includes a capacitor between positive and negative power supply connection terminals has been used. Among such devices, a device that is supplied with power from an auxiliary battery via a mechanical switch generates a relatively large charging current flowing into the capacitor, that is, an inrush current, when the mechanical switch is closed. Such an inrush current may cause damage such as melting at a contact of the mechanical switch. For this reason, measures such as using a mechanical switch with a large rated current and devising a device equipped with a capacitor to suppress a current value of an inrush current are generally taken. As a conventional technique for suppressing an inrush current to a capacitor, there is a technique described in PTL 1, for example.

Figure 4:
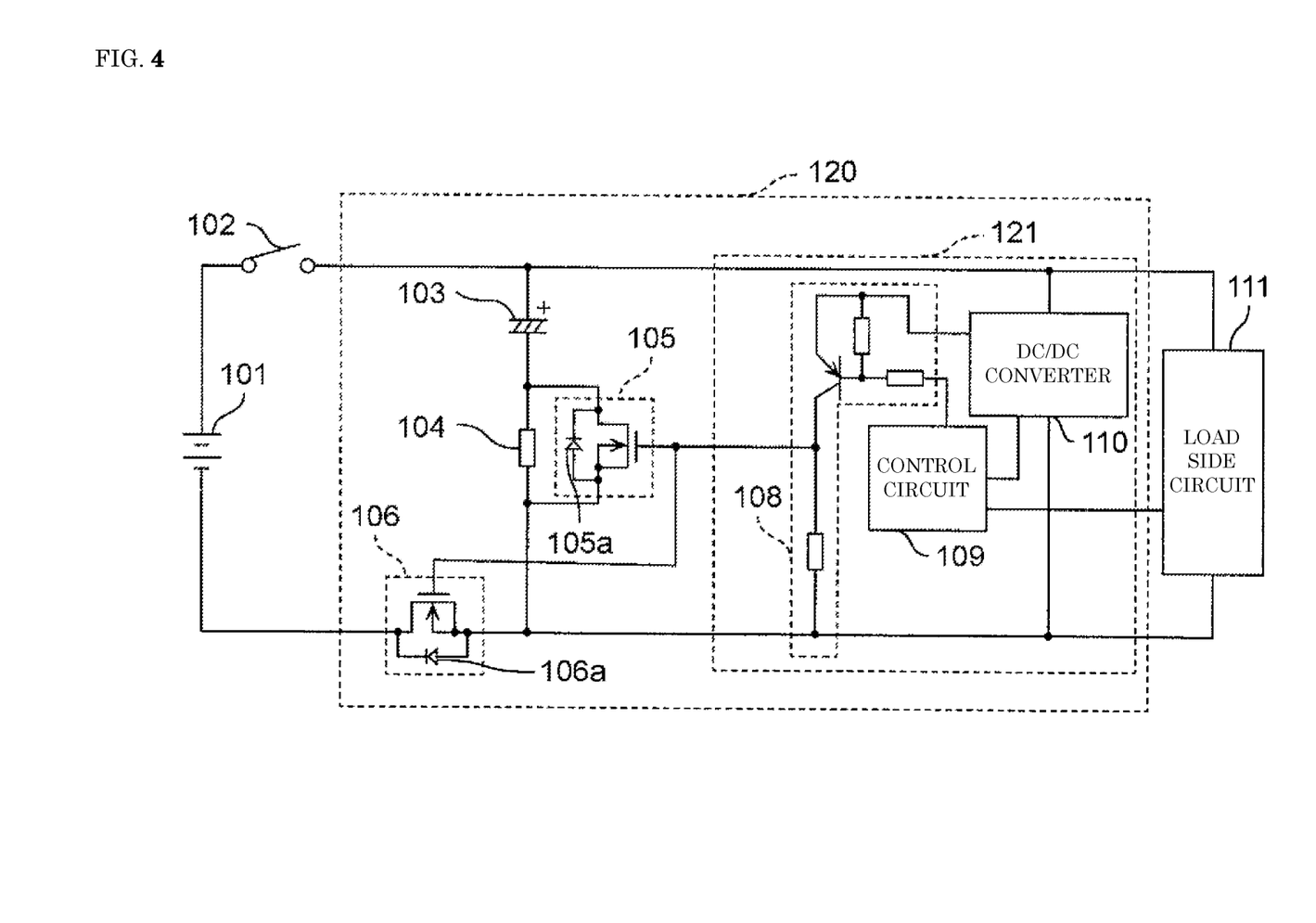
FIG. 4 is a circuit diagram showing a configuration of a power supply protection circuit in which an example of a conventional technique for suppressing an inrush current is used.

FIG. 4 is a circuit diagram showing a configuration of a power supply protection circuit in which an example of the conventional technique for suppressing the inrush current is used.

As shown in FIG. 4, power supply protection circuit 120 described in PTL 1 includes capacitor 103, resistance element 104, metal-oxide-semiconductor field-effect transistors (MOSFETs) 105 and 106, body diodes 105a and 106a, and drive controller 121. Drive controller 121 has drive circuit 108, control circuit 109, and DC/DC converter 110. Note that FIG. 4 also shows DC power supply 101, external switch 102, and load side circuit 111.

Figure 5:
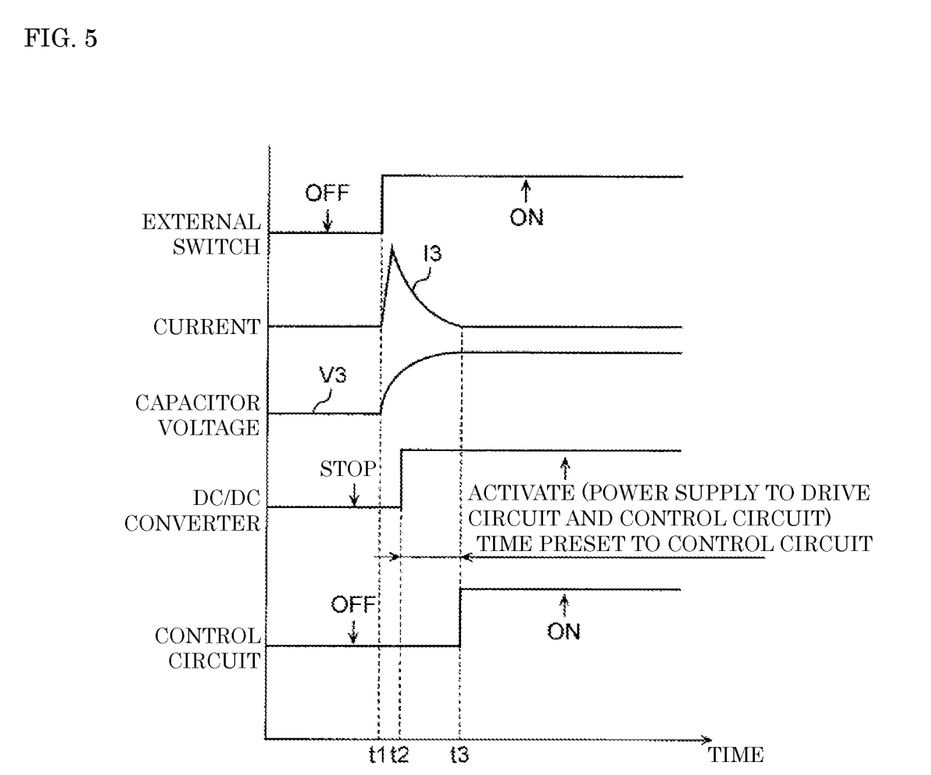
FIG. 5 is a diagram showing operation of the conventional power supply protection circuit.

Operation of power supply protection circuit 120 will be described below with reference to FIGS. 4 and 5. FIG. 5 is a graph showing the operation of conventional power supply protection circuit 120. FIG. 5 shows relationships between time and a state of external switch 102, current I3 flowing through capacitor 103, voltage V3 applied to capacitor 103, a state of DC/DC converter 110, and a state of control circuit 109.

When external switch 102 shown in FIG. 4 is switched to an ON state at time t1, current I3 flows from DC power supply 101 to a series circuit including capacitor 103 and resistance element 104, and voltage V3 of capacitor 103 increases. At subsequent time t2, DC/DC converter 110 is activated, and power supply to control circuit 109 and drive circuit 108 is started. At this time, MOSFET 105 becomes conductive, so that voltage V3 of capacitor 103 further increases. Moreover, current I3 decreases as voltage V3 of capacitor 103 approaches a voltage of DC power supply 101. At subsequent time t3, the voltage of capacitor 103 and the voltage of DC power supply 101 match, so that current I3 becomes zero.

As described above, in the conventional technique, capacitor 103 is charged by the current flowing through resistance element 104 immediately after external switch 102, which is a switch, is switched to the ON state (closed circuit). Then, when DC/DC converter 110 is activated, MOSFET 105 becomes conductive. However, since capacitor 103 is precharged by the current flowing through resistance element 104, the charging is continued without current I3 becoming excessively large. In this way, since an inrush current generated by the closing of external switch 102 is suppressed, a rated current required for MOSFET 105 can be reduced.

However, since MOSFET 105 is continuously energized for a relatively long time, a product having an envelope (so-called power package) having a relatively large allowable loss value is required, and miniaturization and cost reduction of power supply protection circuit 120 are further required.

CITATION LIST

Patent Literature

PTL 1: Unexamined Japanese Patent Publication No. 2014-187768

SUMMARY OF THE INVENTION

The present invention has been made to solve the above problems, and an object thereof is to provide an inrush current suppression device and a motor drive device that can be downsized and reduced in cost.

A first aspect of an inrush current suppression device according to the present invention is an inrush current suppression device for suppressing an inrush current flowing from a DC power supply through a mechanical switch, the device including: a first capacitor having one end connected to a positive terminal of the DC power supply through the mechanical switch; a semiconductor switching element connected to another end of the first capacitor and a negative terminal of the DC power supply between the other end of the first capacitor and the negative terminal of the DC power supply; a resistance element connected in parallel to the semiconductor switching element; and a control circuit for controlling the semiconductor switching element. The control circuit has a first output port, and controls ON time and OFF time of the semiconductor switching element by outputting a pulse width modulation (PWM) signal from the first output port to the semiconductor switching element after the mechanical switch is closed.

As described above, the semiconductor switching element is ON/OFF controlled by the PWM signal after the mechanical switch is closed, whereby a peak value of the inrush current flowing through the semiconductor switching element to the first capacitor can be suppressed. In addition, it is possible to suppress a temperature rise due to a power loss in the semiconductor switching element. Therefore, a rated current required for the semiconductor switching element can be reduced. Hence, it is possible to reduce size and cost of the semiconductor switching element. As a result, it is possible to reduce size and cost of the inrush current suppression device.

Further, a second aspect of the inrush current suppression device according to the present invention, in the first aspect, may further include a delay circuit connected to the first output port and the semiconductor switching element between the first output port and the semiconductor switching element.

This makes it possible to deform a waveform of the PWM signal having a rectangular waveform. Hence, a degree of freedom in adjusting ON time of the semiconductor switching element can be increased. Therefore, a degree of freedom in adjusting the inrush current flowing through the semiconductor switching element can be increased.

Also, in a third aspect of the inrush current suppression device according to the present invention, in the second aspect, the delay circuit converts the waveform of the PWM signal from a rectangular wave shape to a sawtooth wave shape.

As a result, the ON time of the semiconductor switching element can be shortened compared to a case where the PWM signal is input to the semiconductor switching element. Therefore, the inrush current flowing through the semiconductor switching element can be further reduced.

Further, in a fourth aspect of the inrush current suppression device according to the present invention, in the first aspect, the control circuit may gradually increase a duty ratio of the PWM signal.

As the inrush current flows through the semiconductor switching element of the inrush current suppression device, the first capacitor is gradually charged and a voltage applied to the first capacitor rises. A peak value of the inrush current decreases as a difference between this voltage and an output voltage of the DC power supply decreases. Therefore, the control circuit gradually increases the duty ratio of the PWM signal to gradually increase the ON time of the semiconductor switching element. As a result, an amount of inrush current flowing in each cycle of the PWM signal can be made almost constant. Hence, a maximum inrush current can be kept flowing within a range of the rated current of the semiconductor switching element. Therefore, the time required to charge the first capacitor (in other words, the time required to activate the inrush current suppression device) can be reduced.

Further, in a fifth aspect of the inrush current suppression device according to the present invention, in the first aspect, the control circuit may output the PWM signal for a predetermined time and then output an ON signal for maintaining the semiconductor switching element in an ON state.

Thereby, the semiconductor switching element can be maintained in the ON state after charging of the first capacitor is completed. Hence, it is possible to maintain a conduction state between the first capacitor and the DC power supply. Therefore, it is possible to prevent functions of the first capacitor and the like from being hindered by the semiconductor switching element.

Further, a sixth aspect of the inrush current suppression device according to the present invention, in the first aspect, may further include: an inductor having one end connected to the one end of the first capacitor; and a second capacitor connected between another end of the inductor and the other end of the first capacitor.

This makes it possible to construct a π-type high frequency filter. Therefore, for example, it is possible to suppress high frequency noise such as clock noise generated in a control circuit including a microcontroller from leaking to the DC power supply side.

Further, in a seventh aspect of the inrush current suppression device according to the present invention, in the first aspect, the semiconductor switching element may be a field effect transistor.

Further, one aspect of a motor drive device according to the present invention includes: the above-described inrush current suppression device; and an inverter supplied with power from the DC power supply, in which the control circuit further has a second output port that outputs a drive signal for driving the inverter.

According to the present invention, it is possible to realize an inrush current suppression device and a motor drive device that can be reduced in size and cost.

DESCRIPTION OF EMBODIMENT

An exemplary embodiment of the present invention will be described below with reference to the accompanying drawings. It should be noted that the exemplary embodiment described hereinafter illustrates one specific example of the present invention. Numerical values, shapes, materials, components, arrangement positions and connection modes of the components, steps, and order of the steps, for example, illustrated in the following exemplary embodiment are examples, and therefore are not intended to limit the present invention. Among the components in the exemplary embodiment described below, components which are not described in the independent claims showing the top level concept of the present invention are described as arbitrary components. In addition, each of the drawings is not necessarily an exact illustration. In each of the drawings, substantially the same components are designated by the same reference numerals, and overlapping description will be omitted or simplified.

Exemplary Embodiment

An inrush current suppression device and a motor drive device according to an exemplary embodiment will be described.

[Configurations]

Figure 1:
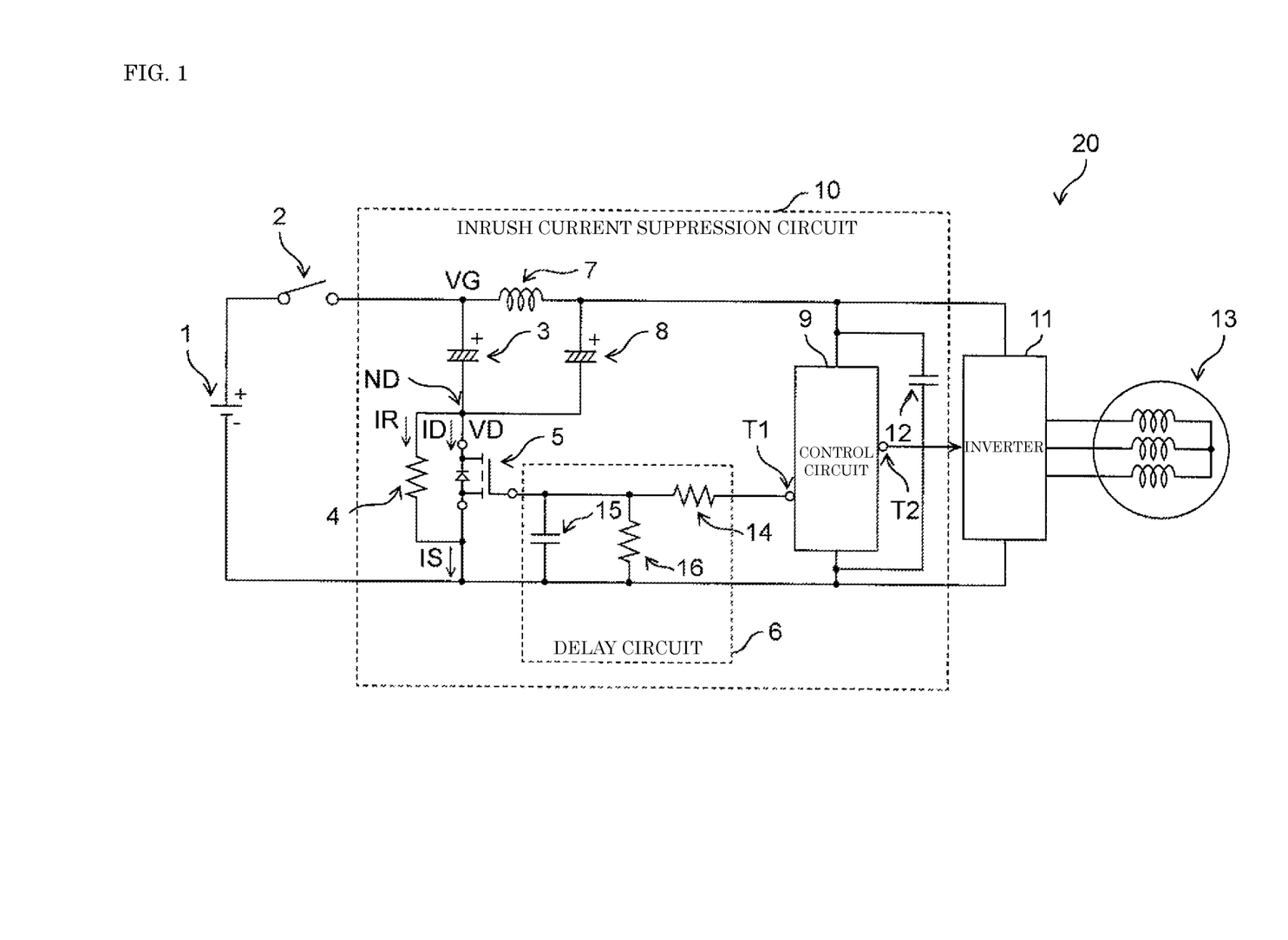
FIG. 1 is a circuit diagram showing configurations of an inrush current suppression device and a motor drive device according to an exemplary embodiment.

Configurations of the inrush current suppression device and the motor drive device according to the present exemplary embodiment will be described with reference to FIG. 1. FIG. 1 is a circuit diagram showing configurations of inrush current suppression device 10 and motor drive device 20 according to the exemplary embodiment.

As shown in FIG. 1, motor drive device 20 includes inrush current suppression device 10 and inverter 11. In addition to motor drive device 20, FIG. 1 shows DC power supply 1 for supplying power to motor drive device 20, mechanical switch 2 connected to DC power supply 1, and motor winding 13 included in a motor driven by motor drive device 20.

DC power supply 1 is a power supply that supplies DC power to inrush current suppression device 10 and motor drive device 20. DC power supply 1 is, for example, an auxiliary battery. A positive terminal of DC power supply 1 is connected to one end of mechanical switch 2, and a negative terminal of DC power supply 1 is grounded.

Mechanical switch 2 is a switch that mechanically switches between conduction and non-conduction. As mechanical switch 2, for example, a mechanical relay can be used.

Motor winding 13 is, for example, a winding used in a brushless motor or the like.

Inrush current suppression device 10 is a device for suppressing an inrush current flowing from DC power supply 1 via mechanical switch 2. Inrush current suppression device 10 includes first capacitor 3, semiconductor switching element 5, resistance element 4, and control circuit 9. Inrush current suppression device 10 further includes delay circuit 6, inductor 7, second capacitor 8, and third capacitor 12.

First capacitor 3 is a capacitive element for voltage smoothing. First capacitor 3, inductor 7, and second capacitor 8 form a π-type high frequency filter. One end of first capacitor 3 is connected to the positive terminal of DC power supply 1 via mechanical switch 2. As first capacitor 3, for example, an electrolytic capacitor can be used. The one end (positive terminal) of first capacitor 3 is connected to the other end of mechanical switch 2 (terminal not connected to DC power supply 1) and one end of inductor 7. The other end (negative terminal) of first capacitor 3 is connected to one end of resistance element 4, a drain (D) terminal of semiconductor switching element 5, and a negative terminal of second capacitor 8.

Semiconductor switching element 5 is an element for suppressing an inrush current. Semiconductor switching element 5 is connected to the other end of first capacitor 3 and the negative terminal of DC power supply 1 between the other end of first capacitor 3 and the negative terminal of DC power supply 1. Semiconductor switching element 5 is a MOSFET. Semiconductor switching element 5 is not particularly limited as long as semiconductor switching element 5 is a switching element using a semiconductor. Semiconductor switching element 5 may be, for example, a field-effect transistor (FET) other than the MOSFET. A gate (G) terminal of semiconductor switching element 5 is connected to control circuit 9. The gate terminal is connected to first output port T1 of control circuit 9 via delay circuit 6. A source (S) terminal of semiconductor switching element 5 is grounded.

Resistance element 4 is an element that suppresses an inrush current, and is connected in parallel to semiconductor switching element 5. Specifically, resistance element 4 is connected between the drain terminal and the source terminal of semiconductor switching element 5. A resistance value of resistance element 4 is, for example, about 100Ω to 1 MΩ.

Control circuit 9 is a circuit that controls semiconductor switching element 5. Control circuit 9 has first output port T1. Control circuit 9 outputs a pulse width modulation (PWM) signal from first output port T1 to semiconductor switching element 5 after mechanical switch 2 is closed, thereby controlling ON time and OFF time of semiconductor switching element 5. Control circuit 9 further has second output port T2 that outputs a drive signal for driving inverter 11. Control circuit 9 can be realized by, for example, a microcontroller (hereinafter abbreviated as micon). The micon is a one-chip semiconductor integrated circuit having a random access memory (RAM), a read only memory (ROM) that stores a program, a central processing unit (CPU) that executes the program, a timer, an input/output circuit, and the like. Control circuit 9 may be realized by an electric circuit other than the micon. Control circuit 9 has a positive terminal and a negative terminal for power input. The positive terminal of control circuit 9 is connected to the positive terminal of DC power supply 1 via mechanical switch 2 and inductor 7. The negative terminal of control circuit 9 is grounded.

Third capacitor 12 is a capacitive element connected in parallel to control circuit 9. More specifically, third capacitor 12 is connected between the positive terminal and the negative terminal of control circuit 9. Third capacitor 12 is used to adjust characteristics of inrush current suppression device 10. As third capacitor 12, a ceramic capacitor having an electrostatic capacitance of about 0.1 μF is used.

Inductor 7 is an element that forms the π-type high frequency filter together with first capacitor 3 and second capacitor 8. The one end of inductor 7 is connected to the one end of first capacitor 3, and the other end of inductor 7 is connected to one end of second capacitor 8.

Second capacitor 8 forms the π-type high frequency filter together with first capacitor 3 and inductor 7. Second capacitor 8 is connected between the other end of inductor 7 (terminal on an opposite side of the terminal to which first capacitor 3 is connected) and the other end of first capacitor 3 (terminal on an opposite side of the positive terminal to which mechanical switch 2 is connected). As second capacitor 8, for example, an electrolytic capacitor is used. The positive terminal and the negative terminal of second capacitor 8 are connected to the other end of inductor 7 and the other end of first capacitor 3, respectively.

Delay circuit 6 is connected to first output port T1 of control circuit 9 and semiconductor switching element 5 between first output port T1 and semiconductor switching element 5. Delay circuit 6 is a circuit that converts a waveform of the PWM signal output from first output port T1. Delay circuit 6 converts the waveform of the PWM signal from a rectangular wave shape to a sawtooth wave shape. Delay circuit 6 has fourth capacitor 15 and resistance elements 14 and 16. Fourth capacitor 15 has one end connected to the gate terminal of semiconductor switching element 5 and the other end grounded. Resistance element 14 has one end connected to the gate terminal of semiconductor switching element 5 and the other end connected to first output port T1 of control circuit 9. Resistance element 16 has one end connected to the gate terminal of semiconductor switching element 5 and the other end grounded.

[Operation and Effect]

Figure 2:
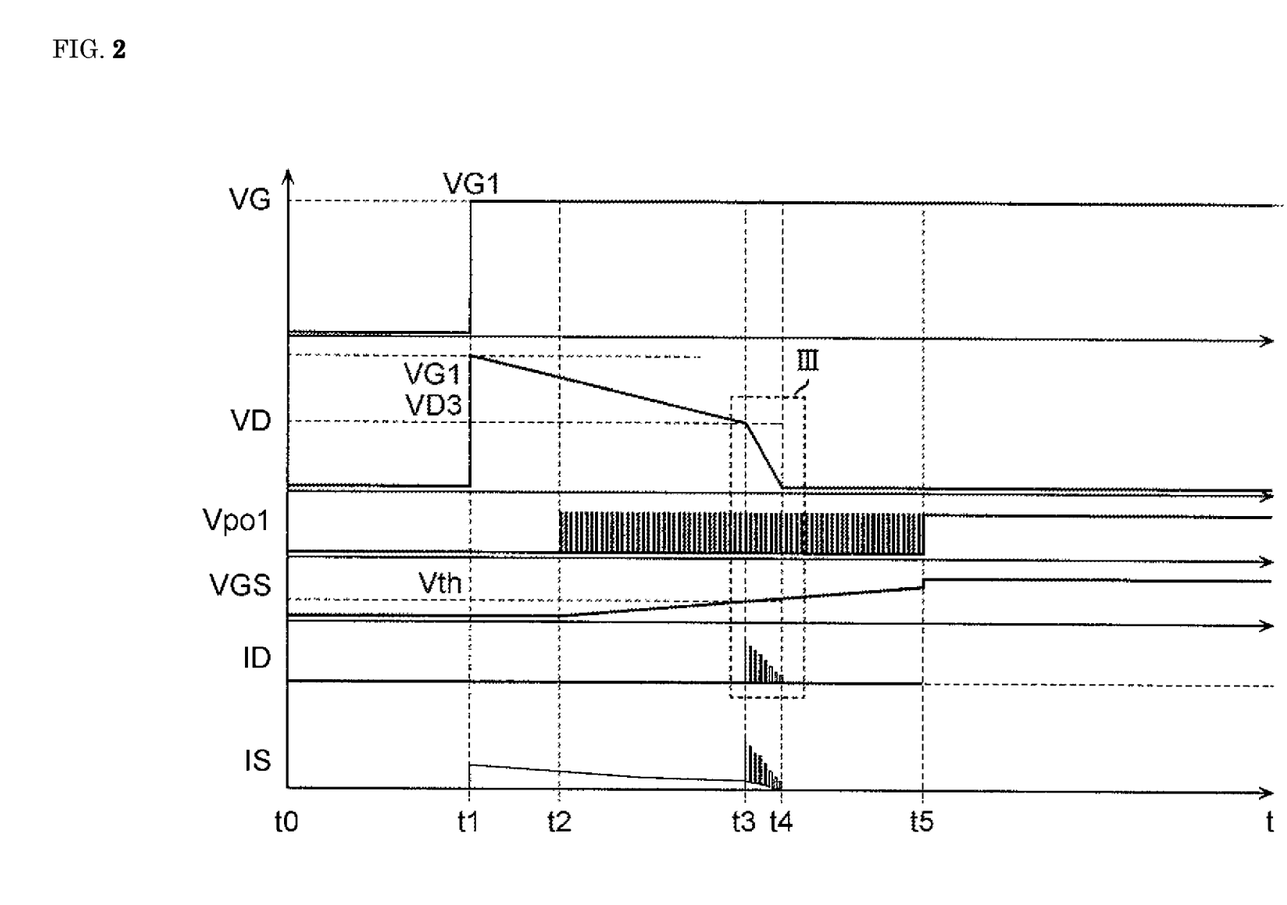
FIG. 2 is a diagram showing characteristics of the inrush current suppression device according to the exemplary embodiment.
Figure 3:
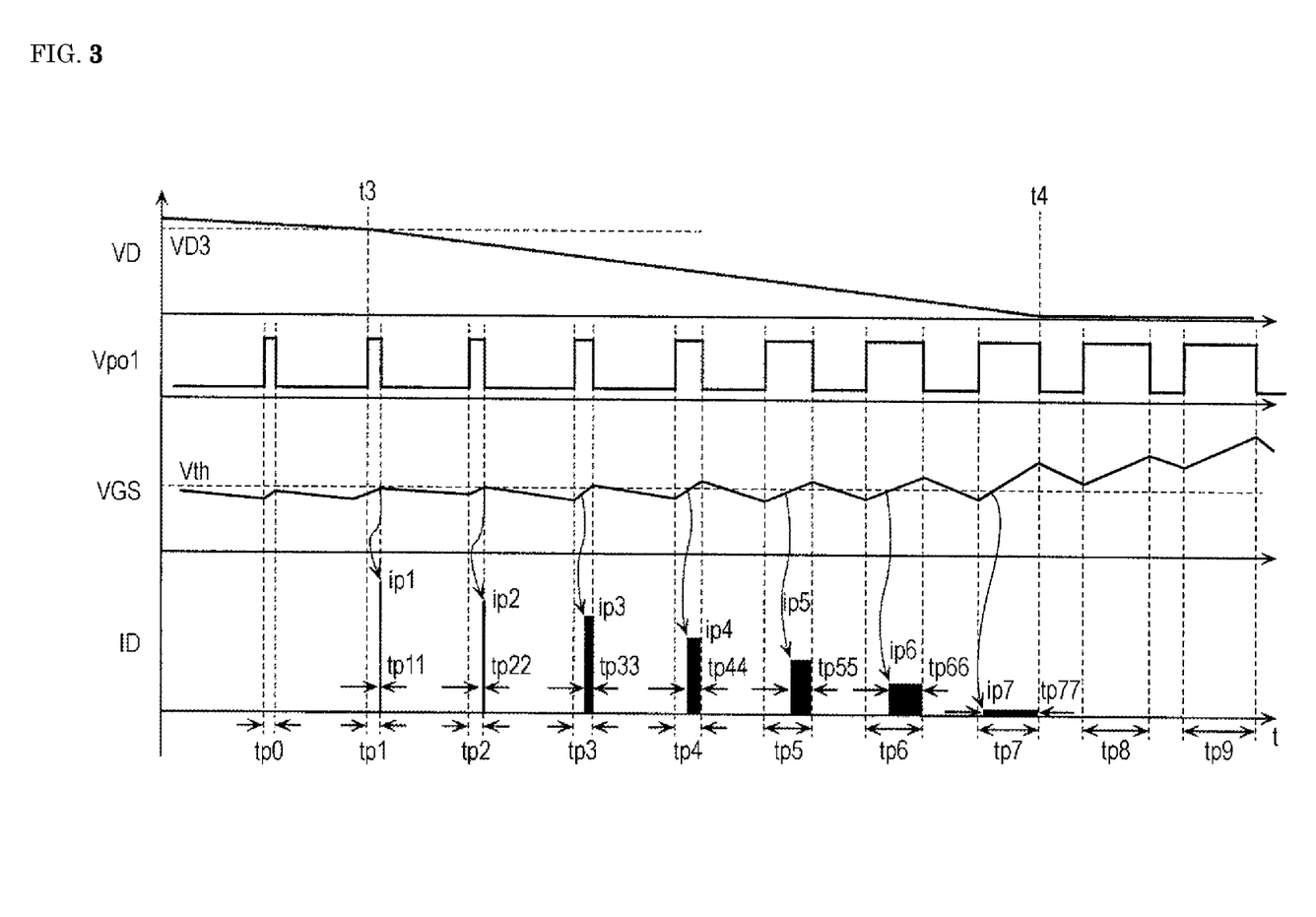
FIG. 3 is a partially enlarged view of FIG. 2.

Operation and effect of inrush current suppression device 10 and motor drive device 20 configured as described above will be described with reference to FIGS. 2 and 3. FIG. 2 is a diagram showing characteristics of inrush current suppression device 10 according to the exemplary embodiment. FIG. 2 shows time waveforms of voltage VG of the positive terminal of first capacitor 3, drain terminal voltage VD of semiconductor switching element 5, PWM signal Vpo1, gate terminal voltage VGS of semiconductor switching element 5, drain current ID, and inrush current IS. FIG. 3 is a partially enlarged view of FIG. 2. In FIG. 3, an inside of broken line frame III shown in FIG. 2 is shown enlarged.

As shown in FIG. 2, first, in an initial state at time t=t0, mechanical switch 2 is in an open-circuit (OFF) state, and voltage VG of the positive terminal of first capacitor 3 is 0 V.

At time t=t1, mechanical switch 2 is closed (turned on), and voltage VG of the positive terminal of first capacitor 3 becomes VG1 which is greater than zero. Drain terminal voltage VD of semiconductor switching element 5 also once rises to VG1. However, since current IR flows through resistance element 4 to start charging first capacitor 3 and second capacitor 8, drain terminal voltage VD continuously decreases after time t=t1. Inrush current IS shown in FIG. 2 corresponds to a sum of current IR flowing through resistance element 4 and drain current ID of semiconductor switching element 5. From time t=t1 to time t=t2 described later, drain current ID is 0, and thus IS=IR. As shown in FIG. 2, inrush current IS continuously decreases from time t=t1 to time t=t2. Here, since the resistance value of resistance element 4 is set to a sufficiently large value, inrush current IS in this period is sufficiently small.

At time t=t2 when a predetermined time has passed from time t=t1, control circuit 9 starts outputting PWM signal Vpo1 from first output port T1. Here, the predetermined time from time t=t1 to time t=t2 is a time required to activate control circuit 9. Control circuit 9 gradually increases a duty ratio of PWM signal Vpo1 from 0% to 100% over time. The PWM signal is smoothed by delay circuit 6 and then input to the gate terminal of semiconductor switching element 5. As a result, gate terminal voltage VGS gradually increases after time t=t2. When gate terminal voltage VGS reaches threshold voltage Vth, semiconductor switching element 5 becomes conductive. Operation of semiconductor switching element 5 during the conduction will be described with reference to FIG. 3.

As shown in FIG. 3, before time t=t3, for example, when a pulse width of PMW signal Vpo1 is tp0, a value of gate terminal voltage VGS of semiconductor switching element 5 is less than threshold voltage Vth. Therefore, before time t=t3, semiconductor switching element 5 is not conductive, and drain current ID is not generated.

After time t=t3, when the pulse width of PWM signal Vpo1 output from first output port T1 of control circuit 9 is tp1, gate terminal voltage VGS reaches Vth. As a result, current ip1 is generated only for minute period tp11. After that, as the duty ratio gradually increases, that is, the pulse width of the PWM signal increases to tp2, tp3, tp4, tp5, tp6, tp7, gate terminal voltage VGS increases. As a result, pulsed drain currents ID such as currents ip2, ip3, ip4, ip5, ip6, ip7 are generated. Energizing time is expanded to tp22, tp33, tp44, tp55, tp66, tp77. On the other hand, peak values of currents ip2, ip3, ip4, ip5, ip6, ip7 decrease. This is because drain terminal voltage VD of semiconductor switching element 5 gradually decreases from voltage value VD3 at time t=t3 due to progress of the charging of first capacitor 3 and second capacitor 8.

With the above effect, compared to a case where semiconductor switching element 5 is in a continuous conduction state and a case where the gate of semiconductor switching element 5 is directly driven by the PWM signal from control circuit 9 without using delay circuit 6, power loss generated in semiconductor switching element 5 remains very small. Further, control circuit 9 gradually increases the duty ratio of the PWM signal, so that the ON time of semiconductor switching element 5 gradually increases, while the peak value of drain current ID gradually decreases. As a result, an amount of inrush current flowing in each PWM cycle and the power loss in semiconductor switching element 5 due to the inrush current can be made substantially constant. Therefore, a maximum inrush current can be kept flowing within a range of a rated current of semiconductor switching element 5. As a result, a time required to charge first capacitor 3 (in other words, a time required to activate inrush current suppression device 10) can be reduced.

After time t=t4, drain terminal voltage VD becomes 0, and even if semiconductor switching element 5 becomes conductive, the current for charging first capacitor 3 and second capacitor 8 is not generated.

Next, returning to FIG. 2, at time t=t5, the PWM signal output from first output port T1 of control circuit 9 has a duty ratio of 100%, that is, becomes a DC signal. In other words, control circuit 9 continuously outputs an ON signal for maintaining semiconductor switching element 5 in an ON state after outputting the PWM signal for a predetermined time. Therefore, after time t=t5, semiconductor switching element 5 maintains the conduction state.

After time t=t5, control circuit 9 outputs a drive signal from second output port T2 to inverter 11 based on a command from an outside (not shown). As a result, inverter 11 starts supplying power to motor winding 13. In this way, motor drive device 20 can drive the motor including motor winding 13.

When control circuit 9 and inverter 11 operate as described above, noise due to the operation of a clock of control circuit 9 and the operation of inverter 11 (high-frequency minute voltage fluctuation) occurs. However, in inrush current suppression device 10 according to the present exemplary embodiment, leakage of the noise to DC power supply 1 and devices (not shown) connected to DC power supply 1 can be suppressed by the π-type filter formed of first capacitor 3, second capacitor 8, and inductor 7.

As described above, inrush current suppression device 10 according to the present exemplary embodiment is inrush current suppression device 10 that suppresses an inrush current flowing from DC power supply 1 via mechanical switch 2, and includes: first capacitor 3 having one end connected to a positive terminal of DC power supply 1 via the mechanical switch; semiconductor switching element 5 connected to the other end of first capacitor 3 and a negative terminal of DC power supply 1 between the other end of first capacitor 3 and the negative terminal of DC power supply 1; resistance element 4 connected in parallel to semiconductor switching element 5; and control circuit 9 for controlling semiconductor switching element 5. Control circuit 9 has first output port T1, and controls ON time and OFF time of semiconductor switching element 5 by outputting a PWM signal from first output port T1 to semiconductor switching element 5 after mechanical switch 2 is closed.

As described above, semiconductor switching element 5 is ON/OFF controlled by the PWM signal after mechanical switch 2 is closed, so that a peak value of the inrush current flowing through semiconductor switching element 5 to first capacitor 3 can be suppressed. In addition, it is possible to suppress a temperature rise due to a power loss in semiconductor switching element 5. Hence, a rated current required for semiconductor switching element 5 can be reduced. Therefore, semiconductor switching element 5 can be reduced in size and cost. Accordingly, inrush current suppression device 10 can be reduced in size and cost. Specifically, in the conventional technique, it is necessary to use a MOSFET having a large power package as a semiconductor switching element. On the other hand, in inrush current suppression device 10 according to the present exemplary embodiment, it is possible to use, as semiconductor switching element 5, a MOSFET or the like having a small signal envelope with a small allowable loss.

Further, inrush current suppression device 10 includes delay circuit 6 connected to first output port T1 and semiconductor switching element 5 between first output port T1 and semiconductor switching element 5.

This makes it possible to deform a waveform of the PWM signal having a rectangular waveform. Hence, a degree of freedom in adjusting ON time of semiconductor switching element 5 can be increased. Therefore, a degree of freedom in adjusting the inrush current flowing through semiconductor switching element 5 can be increased.

Further, in inrush current suppression device 10, delay circuit 6 converts the waveform of the PWM signal from the rectangular wave shape to the sawtooth wave shape, as shown in FIG. 3.

As a result, the ON time of semiconductor switching element 5 can be shortened as compared with a case where the PWM signal is input to semiconductor switching element 5. Therefore, the inrush current flowing through semiconductor switching element 5 can be further reduced.

Further, in inrush current suppression device 10, control circuit 9 gradually increases a duty ratio of the PWM signal.

As described above, as the inrush current flows through semiconductor switching element 5 of inrush current suppression device 10, first capacitor 3 is gradually charged and a voltage applied to first capacitor 3 rises. As a difference between this voltage and an output voltage of DC power supply 1 decreases, the peak value of the inrush current decreases. Therefore, control circuit 9 gradually increases the ON time of semiconductor switching element 5 by gradually increasing the duty ratio of the PWM signal. As a result, an amount of inrush current flowing in each PWM cycle and the power loss in semiconductor switching element 5 due to the inrush current can be made substantially constant. Hence, a maximum inrush current can be kept flowing within a range of the rated current of semiconductor switching element 5. Therefore, the time required to charge first capacitor 3 (in other words, the time required to activate inrush current suppression device 10) can be reduced.

Further, in inrush current suppression device 10, control circuit 9 outputs the PWM signal for a predetermined time and then outputs an ON signal for maintaining semiconductor switching element 5 in an ON state.

As a result, semiconductor switching element 5 can be maintained in the ON state after the charging of first capacitor 3 is completed. Hence, the conduction state between first capacitor 3 and DC power supply 1 can be maintained. Therefore, it is possible to prevent functions of first capacitor 3 and the like from being hindered by semiconductor switching element 5.

Further, inrush current suppression device 10 includes inductor 7 having one end connected to the one end of first capacitor 3 and second capacitor 8 connected between the other end of inductor 7 and the other end of first capacitor 3.

This makes it possible to construct a π-type high frequency filter. Therefore, for example, high frequency noise such as clock noise generated in control circuit 9 including a micon and the like can be prevented from leaking to DC power supply 1 side.

Further, semiconductor switching element 5 is a field effect transistor.

Further, motor drive device 20 includes inrush current suppression device 10 and inverter 11 to which power is supplied from DC power supply 1, and control circuit 9 has second output port T2 that outputs a drive signal for driving inverter 11.

As a result, it is possible to realize motor drive device 20 that can suppress the inrush current and can be downsized and reduced in cost.

(Modifications and Others)

Although inrush current suppression device 10 and motor drive device 20 according to the exemplary embodiment have been described above, the present invention is not limited to the exemplary embodiment.

For example, inrush current suppression device 10 according to the exemplary embodiment includes delay circuit 6, but delay circuit 6 is not an essential component. For example, when control circuit 9 can output a PWM signal having a pulse width short enough to sufficiently suppress the inrush current flowing through semiconductor switching element 5, inrush current suppression device 10 may not include delay circuit 6.

Further, inrush current suppression device 10 according to the exemplary embodiment includes inductor 7 and second capacitor 8, but these elements are not essential components. For example, when noise in control circuit 9 or the like is small, when no other device is connected to DC power supply 1 side, and the like, inrush current suppression device 10 may not include these elements.

Further, in inrush current suppression device 10 according to the exemplary embodiment, control circuit 9 gradually increases the ON time of semiconductor switching element 5, but a mode of the ON time is not limited to this. For example, the ON time of semiconductor switching element 5 may be constant. Also in this case, an effect of reducing the inrush current can be obtained.

In addition, the present invention also includes an embodiment obtained by making various modifications conceived by those skilled in the art to the exemplary embodiment, or an embodiment realized by arbitrarily combining the components and functions in the exemplary embodiment without departing from the spirit of the present invention.

INDUSTRIAL APPLICABILITY

The inrush current suppression device and the motor drive device according to the present invention can be used for a device such as an inverter including a capacitor having a relatively large electrostatic capacitance value between positive and negative electrodes of a DC power supply such as a brushless motor drive device. The inrush current suppression device and the motor drive device according to the present invention are particularly effective for a device in which a battery of an in-vehicle device supplies power via a mechanical switch such as a relay. Further, in the inrush current suppression device and the motor drive device according to the present invention, a small signal MOSFET can be applied. Therefore, it is also useful for a motor drive device and the like that are required to be downsized and reduced in price.

REFERENCE MARKS IN THE DRAWINGS

1 DC power supply
2 mechanical switch
3 first capacitor
4, 14, 16 resistance element
5 semiconductor switching element
6 delay circuit
7 inductor
8 second capacitor
9 control circuit
10 inrush current suppression device
11 inverter
12 third capacitor
13 motor winding
15 fourth capacitor
20 motor drive device

The invention claimed is:

1. An inrush current suppression device for suppressing an inrush current flowing from a DC power supply through a mechanical switch, the device comprising:
   a first capacitor having one end connected to a positive terminal of the DC power supply through the mechanical switch;
   a semiconductor switching element connected to another end of the first capacitor and a negative terminal of the DC power supply between the other end of the first capacitor and the negative terminal of the DC power supply;

a resistance element connected in parallel to the semiconductor switching element; and a control circuit for controlling the semiconductor switching element, wherein the control circuit has a first output port, and controls ON time and OFF time of the semiconductor switching element by outputting a pulse width modulation (PWM) signal from the first output port to the semiconductor switching element after the mechanical switch is closed.

2. The inrush current suppression device according to claim 1, further comprising a delay circuit connected to the first output port and the semiconductor switching element between the first output port and the semiconductor switching element.

3. The inrush current suppression device according to claim 2, wherein the delay circuit converts a waveform of the PWM signal from a rectangular wave shape to a sawtooth wave shape.

4. The inrush current suppression device according to claim 1, wherein the control circuit gradually increases a duty ratio of the PWM signal.

5. The inrush current suppression device according to claim 1, wherein the control circuit outputs the PWM signal for a predetermined time and then outputs an ON signal for maintaining the semiconductor switching element in an ON state.

6. The inrush current suppression device according to claim 1, further comprising:

an inductor having one end connected to the one end of the first capacitor; and a second capacitor connected between another end of the inductor and the other end of the first capacitor.

7. The inrush current suppression device according to claim 1, wherein the semiconductor switching element is a field effect transistor.

8. A motor drive device, comprising:

the inrush current suppression device according to claim 1; and an inverter supplied with power from the DC power supply, wherein the control circuit further has a second output port that outputs a drive signal for driving the inverter.

* * * * *